T. B. ATTERBURY.
Underground Telegraph Line.

No. 220,954.  Patented Oct. 28, 1879.

UNITED STATES PATENT OFFICE.

THOMAS B. ATTERBURY, OF PITTSBURG, PENNSYLVANIA.

IMPROVEMENT IN UNDERGROUND-TELEGRAPH LINES.

Specification forming part of Letters Patent No. 220,954, dated October 28, 1879; application filed September 15, 1879.

*To all whom it may concern:*

Be it known that I, THOMAS B. ATTERBURY, of Pittsburg, county of Allegheny, State of Pennsylvania, have invented or discovered a new and useful Improvement in Underground Electrical-Circuit Lines; and I do hereby declare the following to be a full, clear, concise, and exact description thereof, reference being had to the accompanying drawings, making a part of this specification, in which—like letters indicating like parts—

Figure 1:
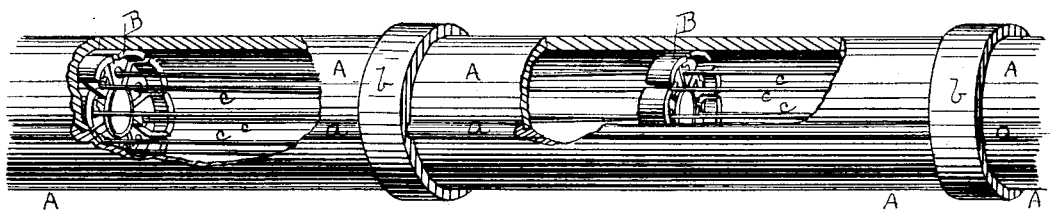
Figure 2:
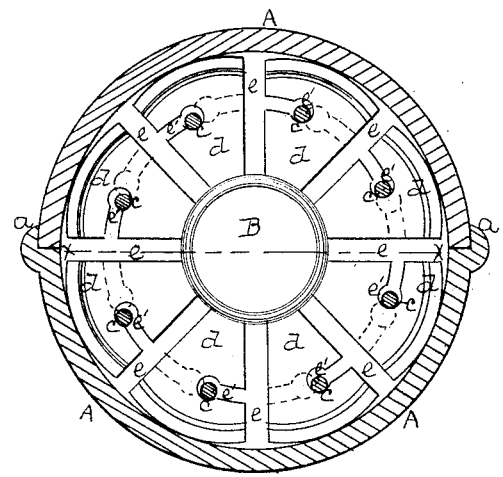
Figure 3:
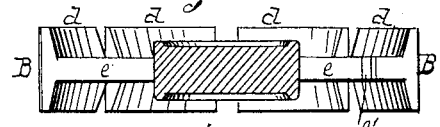

Figure 1 is a perspective view of a portion or section of my improved apparatus for laying and insulating electrical-circuit lines. Fig. 2 shows, in enlarged scale, a transverse section of the same, giving a side view of one of the insulators. Fig. 3 is a horizontal sectional view of each insulator, taken in the line $x\,x$, Fig. 2.

My invention relates to the laying under ground of telegraph or other electrical-circuit lines.

A demand is increasing in the larger cities in this country for some cheap and convenient method and means of laying electrical-circuit lines under ground, instead of supporting them upon poles above ground, as has heretofore been almost the universal custom. The necessity for such change is seriously felt in connection with telephone, fire, and police lines, as it is very difficult, in the present system, to prevent the multitude of lines which are often employed from interfering with each other, so that communication is often interrupted or transferred from one line to another. Also, the expense of keeping the heavily-laden poles or other support in order is very great; and, further, owing to the distance between poles, the wires must be separated by considerable space to prevent contact between poles.

My invention is intended to supply a cheap and effective substitute for the present system of overland lines, and overcome wholly or in great measure the many objections which exist to such lines by providing for laying the same under ground in a compact manner.

This I accomplish by the use of a terra-cotta or baked-clay tube or casing, which incloses the line or lines, and within which these lines are supported at proper intervals, so as to keep them in the desired position and relation by means of glass or vitreous insulators having each a peripheral bearing on the inside of the pipe.

The construction and arrangement of these parts will be readily understood by reference to the accompanying drawings, in which—

A A represent sections or parts of terra-cotta pipe, or pipe made of any suitable non-metallic plastic material and hardened by heat, pressure, or in other known way.

For convenience in laying and arranging the inclosed wires and insulators I prefer to make each pipe-section in two parts, or longitudinally divided into an upper and lower part, as shown, and I fit the parts together with flanges $a$ along the sides, or equivalent tongues or overlapping edges, whereby the parts are kept in proper relative position and convenient means provided for sealing the joint thus made and making it water-tight. A socket, $b$, is also made, in the usual way, at one end of each section, of proper size for receiving the plain end of the next adjacent pipe-section, as illustrated in Fig. 1, and these joints may also be luted, cemented, or otherwise sealed, so as to make them water-tight when finished.

Any well-known or suitable cement or sealing material may be used for this purpose, such as is commonly used in laying terra-cotta water-pipe. At suitable intervals along such pipe—as, for example, in each pipe-section—I arrange an insulator and support, B, which receives and holds in place the wires $c$, which are inclosed within the pipe. These insulators are made, by preference, of glass, though other vitreous material which is a good non-conductor of electricity may be employed, and they are given a proper form to occupy a transverse position in the pipe and be supported by bearing against the sides or interior walls of the same; also, if desired, circumferential recesses may be made in such inner walls for receiving the rim or outer projections of the insulators.

I have shown the pipe and insulators made circular, or approximately so, as being the most convenient form. Other forms may be used, however. These insulators should be made thick enough to give the several parts the requisite strength.

Slots or passages $e$ are made in the insulators, leading inward from the edge or periphery any desired distance, and in the parts or sections $d$ thus formed offset cuts or seats $e'$ are made, into which the wires are passed and in which they rest, as shown in Figs. 1 and 2.

These seats $e'$ may be made in any desired number in the several insulator-sections $d$, depending upon the number of wires required, the distance by which they should be separated, and the size of the pipe and insulators.

The form, direction, and arrangement of the slots $e$ and seats $e'$ may be varied at pleasure. The slots or passages $e$ enable the wires to be passed separately to their respective seats or removed therefrom without disturbing others.

These insulators may be made by pressing, or in other well-known ways of shaping glass, and their cost of manufacture being very small they can be arranged, with small expense, at frequent intervals along the inclosing-pipe, two or more in each section, if desired, and the wires may thus be brought quite close together without danger of touching or interfering, and consequently a great many wires be laid in a comparatively small space. In laying these wires a suitable trench is first prepared and the lower halves or parts of the pipe are laid therein. The desired number of wires are then stretched tight along the pipe, and the insulators placed at proper intervals. At the same time the several wires are passed to their respective places in the seats $e'$. In doing this I prefer to place the successive insulators in reverse positions, so that the wires may be passed to their seats in each insulator in a reverse or different direction from that in the next adjacent insulator; or, in other words, the open sides of the seats $e'$ in one insulator being in the direction from which the hands of a watch move, as shown by full lines in Fig. 2, the open sides of the seats in the next adjacent insulator should be the sides toward which the hands of a watch move, as shown by dotted lines in the same figure; and in the adjustment of the successive insulators they are by preference so arranged that the wires will be caused to bear against the base or unopen sides of the seats, and in any event the insulators are to be turned or adjusted so that by bearing on the wires they will prevent the wires from so far leaving their seats as to be in danger of coming in contact with each other. A kind of lock is thus made between adjacent insulators, which will prevent the wires from being displaced when once arranged. This reverse arrangement of the insulators is illustrated in Fig. 1. These parts being properly arranged, the caps or upper parts of the pipe are put in place and the joints made water-tight, as before described. The trench is then filled, and the several lines are ready for use.

Terra-cotta or similar pipe is itself a good non-conductor of electricity, and this, in connection with the glass insulators described, will give excellent protection to the wires, and when laid in this way there is practically no danger of trouble from interfering or crossing wires, storms, or the many other dangers and troubles which attend the use of lines supported above ground.

The cheapness of my improvement, added to its convenience and security, renders it much better and more desirable in large cities than the present system.

I claim herein as my invention—

1. As a means of inclosing, supporting, and insulating underground electrical-circuit lines, the combination of a terra-cotta or equivalent baked-clay pipe made in sections, and a series of vitreous insulators arranged at intervals along the interior of the pipe, having each a peripheral bearing therein, with passages leading from the periphery of the insulator to one or more inner seats, such passages and seats being adapted to receive and hold the inclosed wires, substantially as set forth.

2. A vitreous electrical insulator adapted in form to have a peripheral bearing against the interior of a pipe or tube, and be supported thereby, and having a series of recesses or seats therein in any desired number, with passages leading therefrom to the periphery of the insulator, for receiving and supporting electrical line-wires, substantially as set forth.

3. In a system of pipes and insulators for laying and supporting telegraph-wires, the insulators having open-sided seats for the wires and peripheral bearings on the inside of the pipes, the mode of locking the wires in their seats by the reverse arrangement of successive insulators, substantially as set forth.

In testimony whereof I have hereunto set my hand.

THOS. B. ATTERBURY.

Witnesses:
R. H. WHITTLESEY,
C. L. PARKER.